US008064960B2

(12) United States Patent
Wisnewski et al.

(10) Patent No.: US 8,064,960 B2
(45) Date of Patent: Nov. 22, 2011

(54) METHOD OF MANAGING MULTIPLE VEHICLE ANTENNAS

(75) Inventors: Mark A. Wisnewski, Stockbridge, MI (US); Steven P. Schwinke, Plymouth, MI (US); David J. Trzcinski, Howell, MI (US)

(73) Assignees: General Motors LLC, Detroit, MI (US); GM Global Technology Operations LLC

( * ) Notice: Subject to any disclaimer, the term of this patent is extended or adjusted under 35 U.S.C. 154(b) by 530 days.

(21) Appl. No.: 12/345,413

(22) Filed: Dec. 29, 2008

(65) Prior Publication Data

US 2010/0164790 A1 Jul. 1, 2010

(51) Int. Cl.
*H04M 1/00* (2006.01)

(52) U.S. Cl. ....................................... 455/562.1; 455/99

(58) Field of Classification Search ............... 455/67.11, 455/99, 101, 115.1, 115.2, 115.3, 115.4, 455/226.1, 226.2, 226.3, 226.4, 345, 562.1
See application file for complete search history.

(56) References Cited

U.S. PATENT DOCUMENTS

| | | | | |
|---|---|---|---|---|
| 7,546,146 | B2 * | 6/2009 | Sievenpiper et al. | 455/562.1 |
| 7,639,999 | B2 * | 12/2009 | Wallace | 455/277.1 |
| 7,676,202 | B2 * | 3/2010 | Anton-Becker | 455/133 |
| 7,945,214 | B2 * | 5/2011 | Kim et al. | 455/69 |

* cited by examiner

*Primary Examiner* — Jeffrey Zweizig

(74) *Attorney, Agent, or Firm* — Anthony L. Simon; Reising Ethington P.C.

(57) ABSTRACT

A system and method of managing multiple vehicle antennas. Wireless signals to and from the vehicle are communicated via a primary antenna system having one or more antennas mounted in a housing on the vehicle. Operation of the primary antenna system is monitored so that, if the primary antenna system is broken or otherwise stops working properly, the system switches to a secondary antenna system housed in a separate location on the vehicle.

20 Claims, 6 Drawing Sheets

METHOD OF MANAGING MULTIPLE VEHICLE ANTENNAS

TECHNICAL FIELD

The present invention relates generally to wireless communications and more particularly to a method of wireless communications with a vehicle.

BACKGROUND OF THE INVENTION

Wireless communications and global positioning technology are used in vehicles with increasing regularity. Both have become commonplace in modern vehicles. As a result, vehicle manufacturers offer an increasing variety of services to vehicle owners and drivers. As an example, GPS technology is a service that helps locate a vehicle and track its location over a period of time. Location and tracking functions can use a telematics device (or telematics unit) integrated with a GPS receiver capable of determining a vehicle position both instantaneously and over a period of time. The telematics device communicates the vehicle position, as well as other data, to a central facility, such as a call center where the call center records the communications. The telematics device receives GPS signals through a first antenna and communicates with the call center through a second antenna. The first and second antennas can be mounted together on the vehicle's exterior and appear as a single element.

Determining and relaying the vehicle's GPS position provides several benefits. For instance, when a vehicle is reported stolen, the call center can begin monitoring the vehicle's position and then report the monitored position to law enforcement authorities. But vehicle thieves have become aware of vehicle tracking and can identify vehicles that benefit from this service by spotting the antennas mounted on the vehicle's exterior. As a result, thieves have developed methods to circumvent vehicle tracking. In one example, thieves physically deform or remove the vehicle antennas thereby impeding the telematics device from communicating the vehicle position to the call center.

SUMMARY OF THE INVENTION

According to an aspect of the invention, there is provided a method of managing multiple vehicle antennas. The method includes transmitting and receiving signals through a primary antenna system having a housing, one or more antennas, and a monitoring circuit located on a vehicle. The method also includes detecting when the performance of the primary antenna system has been degraded below a selected level in which transmitting, receiving, or transmitting and receiving signals through the primary antenna system is impeded, ending the transmitting, receiving, or transmitting and receiving signals of signals through the primary antenna system, and beginning the transmitting, receiving, or transmitting and receiving signals of signals through a secondary antenna system having a separate housing and one or more antennas located within the vehicle.

According to another aspect of the invention, there is provided a method of managing multiple vehicle antennas. The method includes installing a telematics unit in a vehicle that is capable of transmitting and receiving global positioning system (GPS) signals, cellular signals, or both, linking an antenna switch module to the telematics unit that receives the GPS signals or cellular signals from the telematics unit or a primary antenna system, communicating the GPS signals or cellular signals between the antenna switch module and the primary antenna system having a housing, one or more antennas, and a monitoring circuit located on the vehicle, and communicating the GPS signals or cellular signals between the antenna switch module and a secondary antenna system having a separate housing and one or more antennas located within the vehicle when the antenna switch module detects when the performance of the primary antenna system has been degraded below a selected level in which the primary antenna system is unable to transmit the GPS signals or cellular signals.

According to yet another aspect of the invention, there is provided a multiple antenna system for a vehicle. The system includes a telematics unit installed on a vehicle for transmitting and receiving signals, a primary antenna system for transmitting and receiving signals to and from the telematics unit during normal vehicle operation, a diagnostic conductor located with the primary antenna system for indicating whether the primary antenna system has been degraded below a certain level, a secondary antenna system for transmitting and receiving signals to and from the telematics unit when the primary antenna system has been degraded below a selected level, and an RF switch connected in circuit to direct the transmission and reception of signals away from the primary antenna system and to the secondary antenna system when the when the performance of the primary antenna system has been degraded below a selected level in which transmitting, receiving, or transmitting and receiving signals through the primary antenna system is impeded.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

The specific method and system described below in connection with FIGS. 1-6 are directed to different embodiments of a method and system for managing multiple vehicle antennas. As described previously, vehicle thieves often physically remove or damage primary GPS and/or cellular antennas located on the exterior of a vehicle in an effort to conceal the vehicle's whereabouts as the thieves make their getaway. When the primary antenna system is removed or damaged, communications between the vehicle and the call center can be intermittent or non-existent. In order to prevent the thieves from halting vehicle communications, the secondary antenna system, such as a second GPS antenna and second cellular antenna, is also linked to the telematics unit and mounted in an inconspicuous area of the vehicle. When the primary antenna system is vandalized or otherwise suffers a significant decrease in performance, the transmission or reception of signals through the primary antenna system is stopped and the transmission or reception of signals through the secondary antenna system begins. It is possible to sense a decrease in primary antenna performance using a monitoring circuit that automatically directs a telematics unit to stop sending GPS and communications signals to the primary antenna system and begin sending the signals to the secondary antenna system. The secondary antenna system can be mounted where it is out of sight and not easily reached without effort and tools. In other words, the secondary antenna can be located behind vehicle trim pieces or mounted in the recesses of the vehicle frame. The trim pieces can be either exterior trim, like a bumper, or interior trim, such as an instrument panel. In short, the mounting position choices are numerous. But wherever the secondary antenna system is mounted, it likely will be in a hidden area and/or not easily reached or removed.

Communications System

Figure 1:
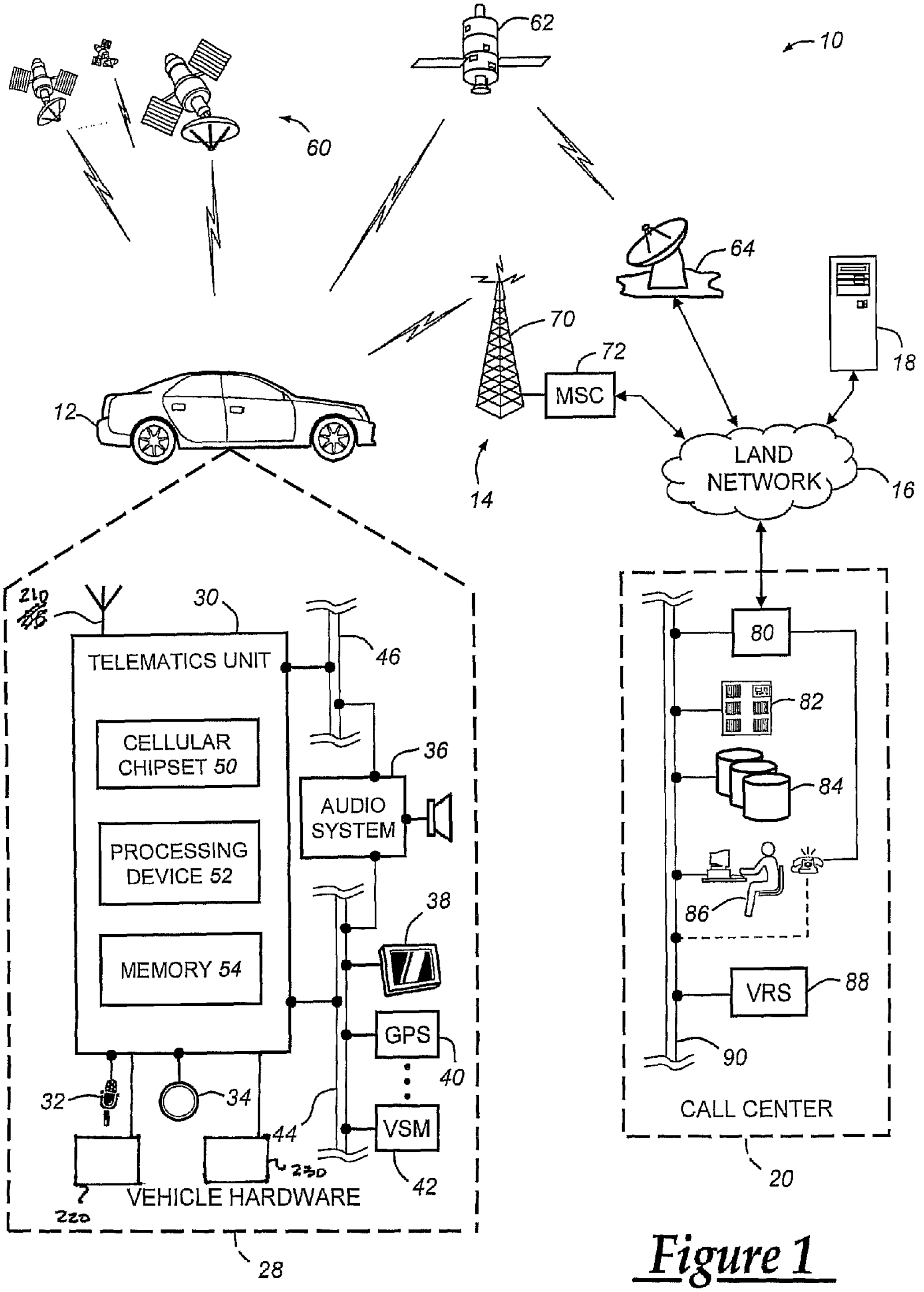
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, a primary antenna system 210, a secondary antenna system 220, and an antenna switching module 230. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Vehicle Antenna System

With reference to the remaining figures, there will now be described various methods and circuits for switching between a primary vehicle antenna system and a secondary vehicle antenna system when the primary antenna system becomes disabled or otherwise degraded in its performance capability. Each antenna system includes one or more antennas; for example, on a vehicle equipped with a telematics unit, but without a GPS module or satellite radio receiver, the primary and secondary antenna systems may each include only a single cellular communication antenna. For a vehicle equipped with more than just a telematics unit, the vehicle may include two or more antennas in both the primary and secondary antenna systems, or may include multiple antennas in the primary antenna system, but only a single (e.g., cellular) antenna in the secondary system. The antennas may be used only for transmitting wireless signals, only for receiving such signals, or for both transmitting and receiving.

In general, each of the methods and circuits described below detect performance degradation of the antenna used in the primary antenna system for communicating telematics unit signals. The approach could be used also or instead to monitor performance of a GPS or other vehicle antenna. Performance degradation in the following methods and circuits is determined by detecting when that performance falls below a selected level in which communication (i.e., transmitting, receiving, or both transmitting and receiving) of signals through the primary antenna system has been measurably impeded. Various other methods and techniques for determining performance degradation of the primary antenna system will become apparent to those skilled in the art.

Figure 2:
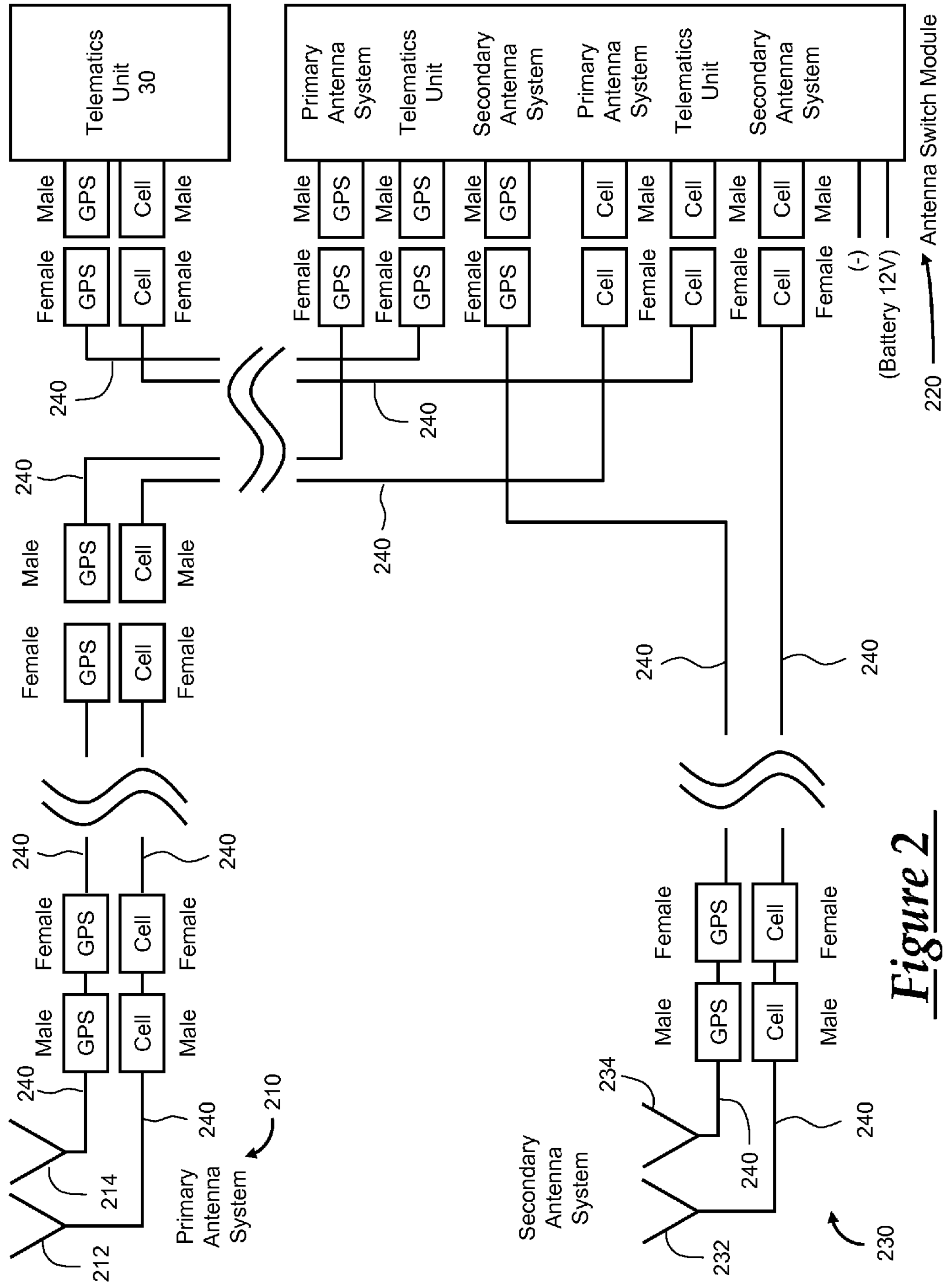
FIG. 2 is a block diagram depicting an arrangement of multiple vehicle antennas and a telematics unit used with the disclosed method.

Turning now to FIG. 2, a multiple antenna system 200 for a vehicle is described.

The system 200 includes a primary antenna system 210, a secondary antenna system 230, a vehicle telematics unit 30, and optionally an antenna switch module 220. The systems 210 and 230, the telematics unit 30, and the antenna switch module 220 are linked via coaxial cables through which data can be communicated. The primary antenna system 210 can include a cellular antenna 212 for sending and receiving cellular communications and a GPS antenna 214 for receiving GPS signals.

The cellular antenna 212 and the GPS antenna 214 can be packaged together thereby creating the impression that the primary antenna system 210 is a single antenna. The primary antenna system 210 can be mounted to the roof of a vehicle 12 and include a weather-resistant housing for protecting the cellular and GPS antennas. This housing can also include a sealing gasket made of synthetic or natural rubber that provides a weather-resistant barrier at a point where the housing of the primary antenna system 210 comes in contact with the exterior of the vehicle 12. The housing itself can be constructed from various plastics and metals that can be coated with paint or left without coating as known in the art. The primary antenna system 210 can be linked via data cables 240 to the antenna switch module 220. Data cables can be any pathway capable of communicating electronic data or electric current and/or voltage. One such example of a data cable is coaxial cable, but effective substitutes for transmitting radio frequency (RF) signals or current and/or voltage are known. The data cables 240 can connect to the primary antenna system 210, the antenna switch module 230, and the secondary antenna system 230 via male/female plug connectors or via direct wire connections as is known in the art. In another example, the primary antenna system 210 can be linked directly to the telematics unit 30 and the functionality of the antenna switch module 220 can be incorporated into the telematics unit 30.

The antenna switch module 220 links the primary antenna system 210, the telematics unit 30, and the secondary antenna system 230. The module 220 can be separate from the telematics unit 30 and include its own housing. As a result, the module 220 can be mounted anywhere in the vehicle and connected to the telematics unit 30 and antenna systems 210 and 230 with data cables 240. Additionally, the primary antenna system 210 includes a monitoring circuit that helps determine whether the performance of the primary antenna system 210 has been compromised. The monitoring circuit can include a diagnostic conductor using a defined tolerance range. If the potential across or the current through the diagnostic conductor falls above or below the defined tolerance range, the primary antenna system 210 can be considered to exhibit performance characteristics below a selected level under which transmitting and/or receiving signals is impeded. The data cables 240 are linked to the antenna switch module 220 using male/female cable connectors. Additionally, the module 220 can be powered by a power source (not shown), such as the battery of the vehicle 12, or a fuel cell if the vehicle 12 uses one.

As shown in FIG. 2, the module 220 receives GPS and/or cellular signals from either the primary antenna system 210 or the secondary antenna system 230 via data cables 240. The antenna switch module 220 can communicate the GPS and/or cellular signals between the telematics unit 30 and the primary antenna system 210 so long as the performance of the primary antenna system 210 has not been degraded. Alternatively, the antenna switch module 220 can detect that the performance of the primary antenna system 210 has been degraded and the antenna switch module 220 can stop communicating GPS and/or cellular signals between the system 210 and the telematics unit 30 and begin communicating the signals between the secondary antenna system 230 and the unit 30. Or in other words, the module 220 can act as a monitoring device to determine if the primary antenna system 210 performance has degraded and as a switch to direct GPS and/or cellular signals to either system 210 or system 230. The switching element of the antenna switch module 220 can be an RF switch capable of stopping the communication of signals between the telematics unit 30 and the primary antenna system 210 and beginning the communication of signals to the secondary communication system 230. Additionally, the RF switch can resume communicating GPS and/or cellular signals between the telematics unit 30 and the primary antenna system 210 if the performance of the primary antenna system 210 improves above a selected level.

Secondary antenna system 230, like the primary antenna system 210, includes a cellular antenna 232 for sending and receiving cellular communications and a GPS antenna 234 for receiving GPS signals. And the system 230 also includes a housing that encloses cellular antenna 232 and the GPS antenna 234. The housing can be similar to that of the primary antenna system 210 and provide weather-resistant protection to the antennas within. In this sense, the secondary antenna system 230 can be located on the exterior of the vehicle 12, albeit in a hidden, secluded, or unreachable place. For instance, the secondary antenna system 230 could be mounted in the undercarriage of the vehicle 12. While the system 230 would be hidden, it would be exposed to the elements of weather and driving conditions where a robust housing and weather-resistant sealing similar to the primary antenna system 210 may be desirable to protect its contents. Alternatively, the secondary antenna system 230 may use a housing where weather-resistant technology is not needed or not a priority. In those applications, the housing can be constructed from molded plastic or stamped metal in one or multiple pieces.

Figure 3:
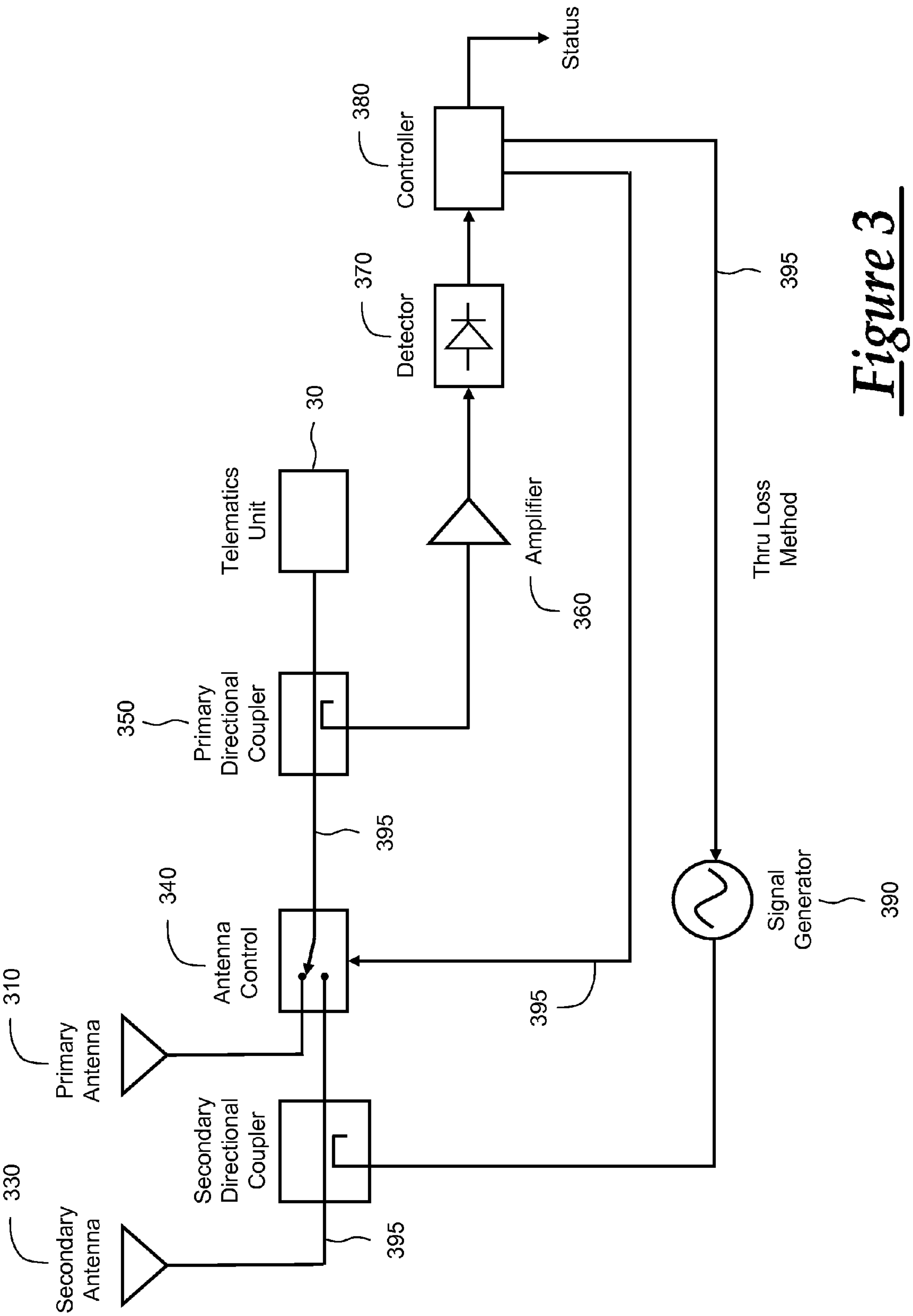
FIG. 3 is a block diagram of a first embodiment of a system implementing the method disclosed herein.

Shown in FIG. 3 is a first embodiment for carrying out a first method of switching between antenna systems. A system 300 for implementing the method is shown. The system 300 in FIG. 3 can be referred to as the Thru-Loss system. The system 300 includes a primary antenna system 310, a secondary antenna system 330, a secondary directional coupler 320, an antenna control switch 340, a primary directional coupler 350, an amplifier 360, a detector 370, a controller 380, a signal generator 390, and the telematics unit 30. These elements of system 300 are linked via data cables 395 that are similar to data cables 240 shown in FIG. 2 and described above.

In system 300, the signal generator 390 generates an RF current that flows through data cables 395 to the secondary directional coupler 320. The coupler 320 transfers a portion of the RF current to the secondary antenna system 330 through the data cable 395 linking the secondary directional coupler 320 and the secondary antenna system 330. The RF current transferred to the secondary antenna system 330 can radiate RF energy to the primary antenna system 310. The primary antenna system 310 then transfers RF current to the primary directional coupler 350 via the data cable 395 and the antenna control switch 340. The primary directional coupler 350 then transfers RF current through data cable 395 to an input of the amplifier 360 and also through a data cable 395 that terminates in the telematics unit 30. The amplifier 360 can increase the amount of RF current to a level detectable by the detector 370. When the amount of RF current reaches this level, the output of the detector 370 changes state. This level can be a predetermined value or the level can be adjustable. The change in state of the detector 370 can drive the input of the controller 380 whose output is linked via data cable 395 to the antenna control switch 340.

The primary antenna system 310 is selected by the antenna control switch 340 as the default antenna through which the telematics unit 30 normally communicates. However, when the RF current through the primary antenna system 310 falls below a threshold level for any reason, the RF current transferred through the primary directional coupler 350 also falls. Less RF current then flows to the amplifier 360 and the detector 370. The output of the detector can fall below a predetermined or adjustable level and drive the input of the controller 380. The output of the controller 380 changes state and indicates a status change. The antenna control switch 340 then directs communication through the secondary antenna system 330 rather than the primary antenna system 310.

Figure 4:
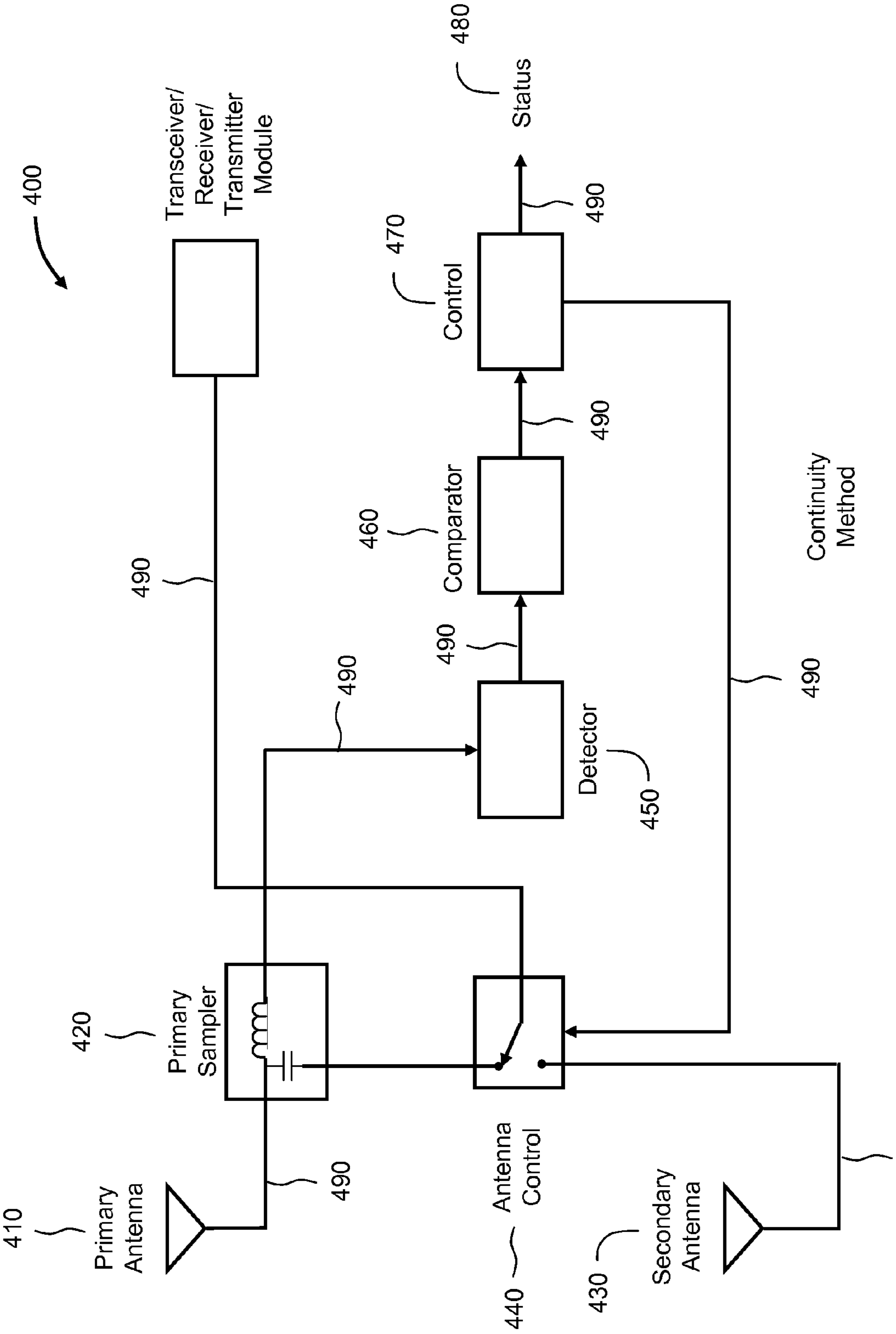
FIG. 4 is a block diagram of a second embodiment of a system implementing the method disclosed herein.

Shown in FIG. 4 is a second embodiment for carrying out a second method of switching between antenna systems. A system 400 for implementing the method is shown. The system in FIG. 4 will be referred to as the Continuity system. The system 400 includes a primary antenna system 410, a secondary antenna system 430, a primary sampler 420, an antenna controller 440, a detector 450, a comparator 460, a controller 470, and the telematics unit 30. These elements of system 400 are linked via data cables 490 that are similar to data cables 240 shown in FIG. 2 and described above.

The primary antenna system 410 and the secondary antenna system 430 each contain a status reference element that can be used to determine the condition of both the primary antenna system 410 and the secondary antenna system 430. Examples of the status reference element include a pull up resistor or a pull down resistor that adds a dc signal or other sample information onto signals conducted from one or both of the antennas. The primary sampler 420 receives an RF signal from the primary antenna system 410 and separates sample information from the RF signal. The sample information is transmitted via data cable 495 to the input of the detector 450 and the RF signal is transmitted via data cable 495 to the antenna controller 440. The output of the detector 450 is linked via a data cable 490 to the input of the controller 470. The controller 470 compares the output of the detector 450 with an internal threshold reference. This reference can be predetermined and fixed or adjustable. When the controller 470 senses that the output of the detector 450 has risen above the internal threshold reference that indicates a performance problem with the primary antenna system, the controller 470 transmits a signal to the antenna controller 440 to end communications between the primary antenna system 410 and the telematics unit 30 and begin communications between the secondary antenna system 430 and the telematics unit 30. One example of the signal to the antenna controller 440 is a voltage output that rises above a threshold level. Additionally, the controller 470 can produce a status output 480 to a monitoring device (not shown).

This system 400 is arranged to direct communications from telematics unit 30 to the secondary antenna system 430 as long as the performance of the primary antenna system 410 is degraded. If, for some reason, the primary antenna system 410 becomes able to satisfactorily transmit and receive signals, the system 400 detects this change and automatically directs the antenna controller 440 to begin transmitting signals between the telematics unit 30 and the primary antenna system 410. An example of this mechanism is explained in more detail in FIG. 6.

Figure 5:
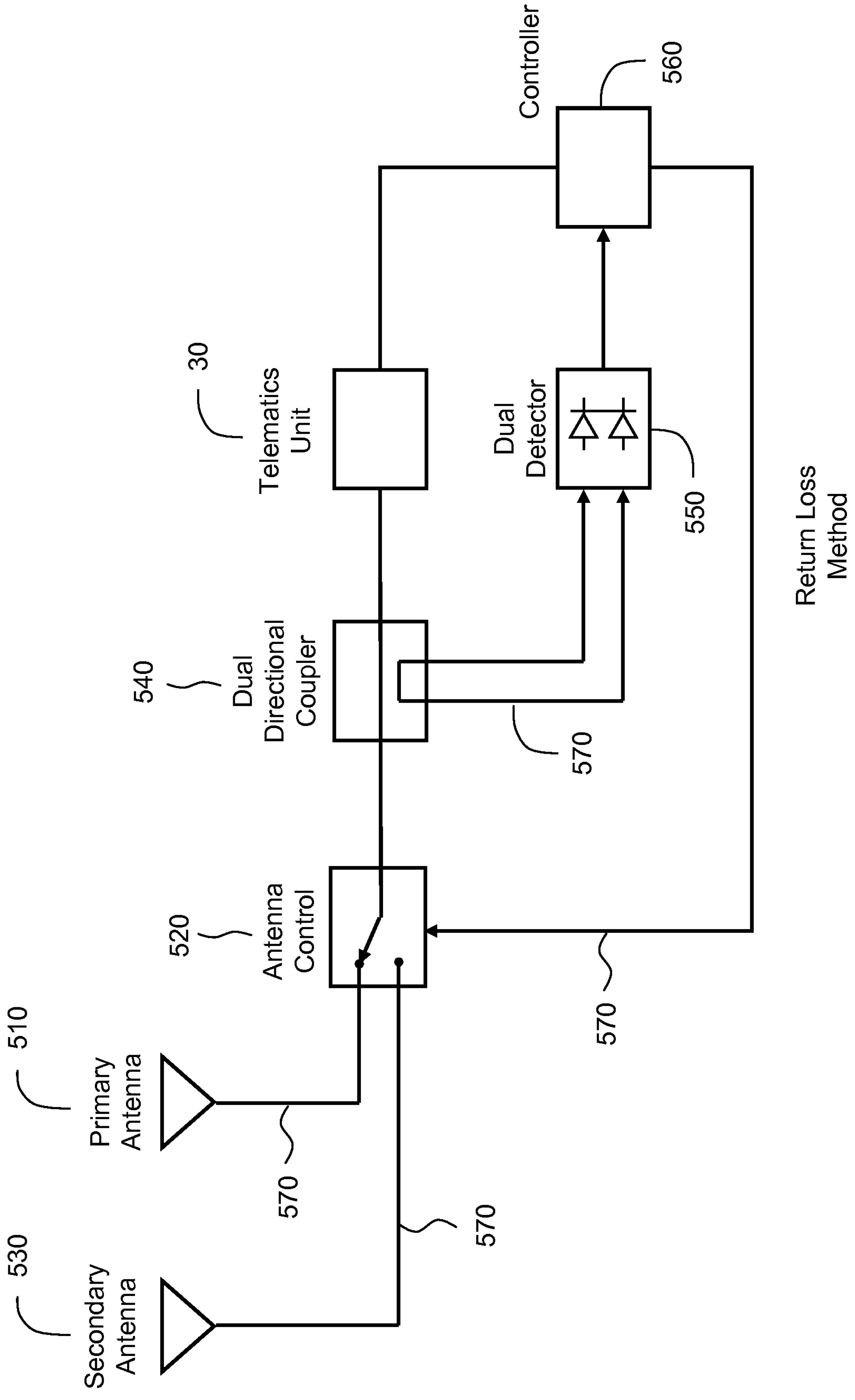
FIG. 5 is a block diagram of a third embodiment of a system implementing the method disclosed herein.

Shown in FIG. 5 is a third embodiment for carrying out a third method of switching between antenna systems. A system 500 for implementing the method is shown. The system in FIG. 5 will be referred to as the Return Loss system. The system 500 includes a primary antenna system 510, an antenna controller 520, a secondary antenna system 530, a dual-direction coupler 540, a dual detector 550, a controller 560, and the telematics unit 30. These elements of system 500 are linked via data cables 590 that are similar to data cables 240 shown in FIG. 2 and described above.

In system 500, the telematics unit 30 transmits an RF current to the dual-directional coupler 540. The dual-directional coupler 540 can provide samples of RF power from both an RF power transmitted to the antenna controller 520 and power reflected back from the primary antenna system 510. Samples of both the RF power transmitted to the antenna controller 520 and the RF power reflected back from the primary antenna system 510 are transmitted to the dual detector 550. The dual detector 550 can compare the ratio of reflected RF power from the primary antenna system 510 with the sample of RF power transmitted to the antenna controller 520. If the dual detector determines that the ratio between the reflected RF power and the sample of RF power transmitted to the antenna controller 520 rises above a predetermined level, the output of the detector 550 can drive the controller 560 high and the output of the controller 560 can then transmit a signal to the antenna controller 520 to switch from the primary antenna system 510 to the secondary antenna system 530. When controller 560 switches between the primary and secondary antenna systems 510, 530, it can report this change to telematics unit 30 via line 520.

Figure 6:
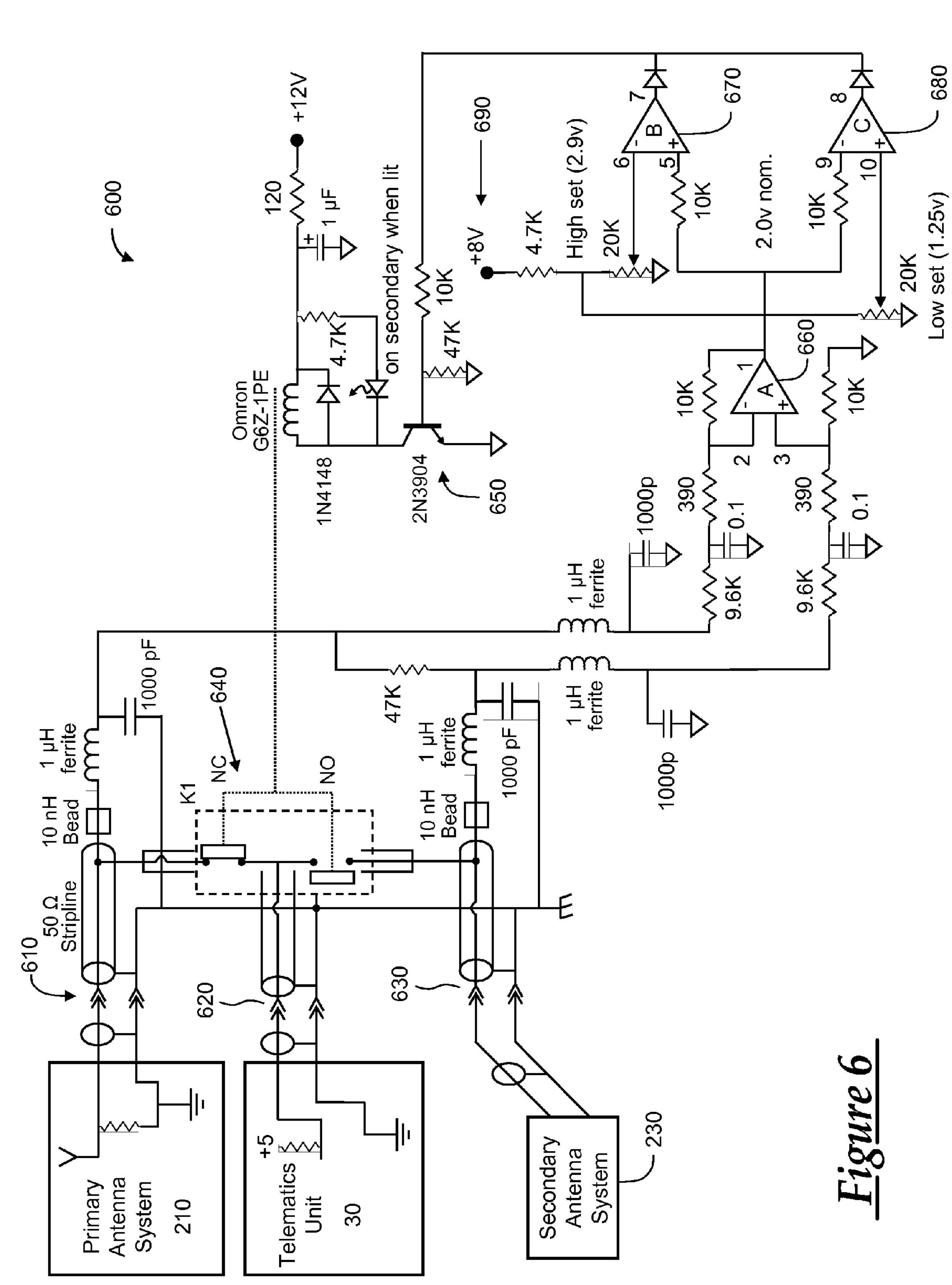
FIG. 6 is a circuit diagram depicting a multiple vehicle antenna system of a vehicle.

Turning now to FIG. 6, a circuit diagram of a Continuity-type monitoring circuit 600 for a multiple vehicle antenna system will now be described. This arrangement depicted in the diagram involves circuit elements that can be located either in the antenna switch module 220 described in FIG. 2 or the telematics unit 30. As shown in FIG. 6, the circuit includes a primary antenna system signal 610, a telematics unit signal 620, and a secondary antenna system signal 630. The primary antenna system signal 610 and the secondary antenna system signal 630 carry data, such as GPS receiver data and cellular communications. The telematics unit signal includes sample information in the form of a dc signal added to the cellular antenna signal line. Both the primary system signal line 610 and the secondary system signal line 630 are connected to their respective antenna systems 210 and 230 shown in FIG. 2. Linking the primary system signal 610 and the secondary system signal 630 with the telematics unit signal line 620 is a switch 640. The switch 640 can be an RF relay that controlled by a NPN-type binary-junction transistor (BJT) 650. In one example, the BJT 650 is part number 2N3904, which is a common NPN BJT transistor used for general purpose low-power amplifying or switching applications. During normal operation, the switch 640 is biased in a closed position relative to the primary system signal 610 and simultaneously in an open position relative to the secondary system signal 630. Normal operation can be described as occurring when the primary antenna system 210 shown in FIG. 2 is functioning satisfactorily to send and receive cellular signals. During normal operation, the switch 640 communicates data between the telematics unit 30 and the primary antenna system 610. The primary system signal 610 and the secondary system signal 630 are linked to a balanced differential comparator that uses an inverting operational amplifier (op amp) 660. The telematics unit signal 620 can be supplied by the telematics unit 30 through the primary antenna system 210 shown in FIG. 2. The telematics device 30 can include a pull-up resistor and primary antenna system 210 can include an identical pull-down resistor creating a series resistive ladder for the dc sample voltage added to the antenna signal from the telematics unit 30. In one example, the dc sample signal is 5.0 V (volts). While the primary antenna system 210 shown in FIG. 2 is functioning properly, this 5.0 V signal is divided in half by the pull-up/pull-down resistors so that a superimposed 2.5 V signal is seen at the inputs 610, 620 of monitoring circuit 600. This 2.5 volts is sampled by a primary sampler that passes through the dc voltage to op-amp 660 while blocking the rf antenna signals. In this example, the differential balancing circuit implemented by op-amp 660 measures the voltage across the 47K resistor and outputs it for use by op-amps 670 and 680.

Op-amps 670 and 680 receive $V_{out}$ of the inverting op amp 660 at $V_{in}^{+}$ and $V_{in}^{-}$ respectively. The first non-inverting op amp 670 and a second non-inverting op amp 680 can be powered by a power source 690. The power source 690 can be configured to provide a high voltage input and a low voltage input to $V_{in}^{-}$ and $V_{in}^{-}$ of the first non-inverting op amp 670 and the second non-inverting op-amp 680 respectively. In one example, the power source 690 can be generated by the battery of the vehicle 12 and the voltage, through techniques known to those skilled in the art, can be set to various voltages depending on the application. These techniques can include the use of variable resistors or the wiring of various resistors in parallel and series to produce a desired voltage inputs. The voltage inputs from the power source 690 to $V_{in}^{-}$ and $V_{in}^{+}$ of the first non-inverting op amp 670 and the second non-inverting op-amp 680 can act as reference points for comparing $V_{out}$ of the inverting op amp 660. In FIG. 3, the high voltage input and the low voltage input to $V_{in}^{-}$ and $V_{in}^{+}$ of the first non-inverting op amp 670 and the second non-inverting op-amp 680 respectively is shown as a high-set equal to 2.9 V and a low set equal to 1.2 V respectively. $V_{out}$ of both the first non-inverting op amp 670 and a second non-inverting op amp 680 are connected to the base of the BJT 650. During normal operation, $V_{out}$ of the first and second non-inverting op amps 670 and 680 is not large enough to pull the BJT 650 high-the emitter of the BJT 650 is wired to ground—and the switch 640 remains closed. For instance, when $V_{out}$ of the inverting op amp 660 has a value of 2.5 V during normal operation, the difference in the values of $V_{in}^{+}$ and $V_{in}^{-}$ and the high-set and low-set voltages are not great enough to pull the BJT 650 high.

In situations where the performance of the primary antenna system 210 shown in FIG. 2 becomes degraded, the resistance of the resistor located in the antenna system 210 can increase (e.g., become open-circuited) or can decrease (e.g., be shorted) and thereby cause the dc voltage of the telematics unit signal 620 to go up to 5.0 V or down to 0 V. Or the telematics unit signal 620 can be lost altogether. This difference can be automatically recognized by the arrangement of the inverting op amp 660 and the non-inverting op amps 670 and 680. Thus, for example, when the dc component of the telematics unit signal 620 decreases to 0 V due to a short to ground of the primary antenna system signal 610, $V_{out}$ of the inverting op amp 660 increases to nearly 5 V. $V_{out}$ of the inverting op amp 660 is linked to $V_{in}^{+}$ of the first non-inverting op amp 670 and $V_{in}^{-}$ of the second non-inverting op amp 680. At the first non-inverting op amp 670, $V_{out}$ of the inverting op amp 660 can be compared to the reference voltage or high set voltage supplied to $V_{in}^{-}$ from the power supply 690. In the present example, $V_{in}^{+}$ of the first non-inverting op amp 670 received from $V_{out}$ of the first inverting op amp is 2.5 V and $V_{in}^{-}$ is 2.9 V during normal operation. In this state, $V_{out}$ of the first non-inverting op amp 670 is substantially equal to 0 V. But when $V_{out}$ at the inverting op amp 660 rises to 5.0 V due to the decrease in voltage of the primary system signal 610, $V_{in}^{-}$ at the first non-inverting op amp 670 rises and when the voltage of $V_{in}^{+}$ becomes greater than the high set voltage, $V_{out}$ of the first non-inverting op amp 670 increases in voltage enough to drive the BJT 650 high. In one example, $V_{out}$ of the op amp 670 can increase to 5.0 V. Similarly, the second non-inverting op amp 680 can determine whether the primary system signal 610 falls below a predetermined amount.

Another way in which the performance of the primary antenna system 610 becomes degraded is due to an open-circuit in the primary antenna system signal line 610. This can be a result of separating the primary antenna system 610 from the vehicle 12. In this case, the voltage of the telematics unit system signal 620 increases from 2.5 V to 5 V. This difference can be automatically recognized by the arrangement of inverting op amp 660 and the non-inverting op amps 670, 680. When the telematics unit system signal 620 increases to 5.0 V, $V_{out}$ of the inverting op amp 660 decreases. In this example, $V_{out}$ of the second non-inverting op amp 680 is substantially equal to 0 V. But when $V_{out}$ of the inverting op amp 660 falls to near 0 V due to the loss of resistance in the primary antenna system 210 shown in FIG. 2 and the telematics unit system signal 620 increasing to 5 V, $V_{in}^{-}$ at the second non-inverting op amp 680 falls, and when $V_{in}^{-}$ falls to a point less than the low set point, $V_{out}$ rises. $V_{out}$ of the first non-inverting op amp 670 increases in voltage enough to drive the BJT 650 high. In one example, $V_{out}$ of the op amp 370 can increase to 5.0 V.

When the BJT 650 is driven high, a voltage can be applied to the switch 640. The voltage can change the position of the switch 640 from its biased position into a closed position relative to the secondary system signal 630 and an open position relative to the primary system signal 610. While the BJT 650 is driven high, the switch 640 can direct the GPS and/or cellular signals between the secondary antenna system 230 shown in FIG. 2 and the telematics unit 30. A light-emitting diode can be included and illuminated when the BJT 650 is driven high.

If the primary system signal 610 returns, or more particularly the voltage at $V_{in}^{-}$ of the inverting op amp 660 becomes closer to the voltage of the normal state, in this case 2.5 V, the circuit shown in FIG. 3 can detect this change and redirect the primary system signal 610 to the telematics unit 30 by returning the switch 640 to its biased position.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, in the FIG. 6 Continuity circuit example, rather than using a pull-down resistor in the primary antenna system, the dc current can flow through the antenna itself to ground. Alternatively, a separate powered wire to the primary antenna system can be used and/or a separate conductive trace within the primary antenna system, such as one contained on the circuit board used to mount the antenna or other antenna system components. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of managing multiple vehicle antennas, comprising the steps of:

(a) transmitting and receiving signals through a primary antenna system having a housing, one or more antennas, and a monitoring circuit located on a vehicle;

(b) detecting when the performance of the primary antenna system has been degraded below a selected level in which transmitting, receiving, or transmitting and receiving signals through the primary antenna system is impeded;

(c) ending the transmitting, receiving, or transmitting and receiving signals of signals through the primary antenna system; and (d) beginning the transmitting, receiving, or transmitting and receiving signals of signals through a secondary antenna system having a separate housing and one or more antennas located within the vehicle.

2. The method of claim 1, wherein step (b) further comprises detecting whether a short circuit or an open circuit exists between a vehicle telematics unit and the primary antenna system.

3. The method of claim 1, wherein the monitoring circuit of the primary antenna system includes a diagnostic conductor.

4. The method of claim 3, further comprising the step of detecting if a circuit through the diagnostic conductor becomes broken.

5. The method of claim 3, wherein step (c) further comprises ending the transmission of signals through the primary antenna system when the measured current or voltage to the diagnostic conductor lies outside of a defined tolerance range.

6. The method of claim 1, wherein step (b) further comprises detecting a change to the voltage standing wave ratio (VSWR) of the primary antenna system.

7. The method of claim 6, wherein the detection occurs periodically based on a defined temporal interval.

8. The method of claim 1, wherein step (b) further comprises:

transmitting an operations signal between the primary antenna system and the secondary antenna system; and detecting a reduction in the strength of the operations signal.

9. A method of managing multiple vehicle antennas, comprising the steps of:

(a) installing a telematics unit in a vehicle, wherein the telematics unit is capable of transmitting and receiving global positioning system (GPS) signals, cellular signals, or both;

(b) linking an antenna switch module to the telematics unit, wherein the module receives the GPS signals or cellular signals from the telematics unit or a primary antenna system;

(c) communicating the GPS signals or cellular signals between the antenna switch module and the primary antenna system having a housing, one or more antennas, and a monitoring circuit located on the vehicle; and (d) communicating the GPS signals or cellular signals between the antenna switch module and a secondary antenna system having a separate housing and one or more antennas located within the vehicle when the antenna switch module detects when the performance of the primary antenna system has been degraded below a selected level in which the primary antenna system is unable to transmit the GPS signals or cellular signals.

10. The method of claim 9, wherein detecting in step (d) further comprises detecting whether a short circuit or an open circuit exists between a vehicle telematics unit and the primary antenna system.

11. The method of claim 9, wherein the primary antenna system comprises a module that includes a diagnostic conductor.

12. The method of claim 11, further comprising the step of detecting if a circuit through the diagnostic conductor becomes broken.

13. The method of claim 10, wherein the step (d) further comprises transmitting signals to the secondary antenna system when the measured current or voltage to the diagnostic conductor lies outside of a defined tolerance range.

14. The method of claim 13, further comprising:

detecting that the measured voltage or current to the diagnostic conductor has re-entered the defined tolerance range;

ending the transmission of the signals to the secondary antenna system; and beginning the transmission of the signals to the primary antenna system.

15. The method of claim 9, wherein step (d) further comprises detecting a change to the voltage standing wave range (VSWR) of the primary antenna system.

16. The method of claim 15, wherein the detection occurs periodically based on a defined temporal interval.

17. The method of claim 9, wherein the GPS or cellular signals are transmitted through the primary antenna system or the secondary antenna system via a wifi protocol.

18. A multiple antenna system for a vehicle, comprising:

(a) a telematics unit installed on a vehicle for transmitting and receiving signals;

(b) a primary antenna system for transmitting and receiving signals to and from the telematics unit during normal vehicle operation;

(c) a diagnostic conductor located with the primary antenna system for indicating whether the primary antenna system has been degraded below a certain level;

(d) a secondary antenna system for transmitting and receiving signals to and from the telematics unit when the primary antenna system has been degraded below a selected level; and (e) an RF switch connected in circuit to direct the transmission and reception of signals away from the primary antenna system and to the secondary antenna system when the when the performance of the primary antenna system has been degraded below a selected level in which transmitting, receiving, or transmitting and receiving signals through the primary antenna system is impeded.

19. The system of claim 18, further comprising an antenna switch module that houses the RF switch and a diagnostic conductor and communicates the signals between the telematics unit, the primary antenna system, and the secondary antenna system, wherein the antenna switch module is a discrete unit located apart from the telematics unit.

20. The system of claim 18, wherein the telematics unit detects that an open circuit exists at the diagnostic conductor and a flag is set within the telematics unit indicating that the signals will be transmitted and received using the secondary antenna system.

* * * * *